UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DIHYDROCHLORID OF DIAMINODIOXYARSENOBENZENE.

1,116,398.     Specification of Letters Patent.     Patented Nov. 10, 1914.

No Drawing.     Application filed November 13, 1911. Serial No. 660,119.

*To all whom it may concern:*

Be it known that we, PAUL EHRLICH, M. D., professor of medicine, and ALFRED BERTHEIM, Ph. D., citizens of the Empire of Germany, residing at Frankfort-on-the-Main, Germany, have invented certain new and useful Improvements in Dihydrochlorid of Diaminodioxyarsenobenzene, of which the following is a specification.

By reducing the 3-amino-4-oxy-phenyl arsinic acid there is produced the $3\text{-}3^1\text{-}$ diamino $\text{-}4\text{-}4^1$ dioxyarsenobenzene which, when dry, forms a yellow powder, insoluble in water, and soluble in caustic soda lye. By treating this product with hydrochloric acid there can be prepared from it a dihydrochlorid, which is very valuable for therapeutical purposese especially as a remedy for syphilis and other infectious diseases.

The said dihydrochlorid of the diaminodioxyarsenobenzene is a yellow powder, readily soluble in water and methyl alcohol, almost insoluble in ether and acetone. From its aqueous solution the free base is precipitated by sodium carbonate, or sodium acetate and also by caustic soda lye, but it re-dissolves readily in an excess of the latter. From the aqueous solution of the dihydrochlorid there is precipitated by means of diluted sulfuric acid the sulfate, which is very difficultly soluble.

The procedure for manufacturing the dihydrochlorid may, for instance, be as follows: 366 parts by weight of powdered $3\text{-}3^1\text{-}$diamino $\text{-}4\text{-}4^1\text{-}$dioxyarsenobenzene are stirred in 3000 parts of cold methylalcohol and there are then added 292 parts of an alcoholic solution of hydrochloric acid of 25% strength, whereby the base dissolves with formation of the dihydrochlorid. After filtration, this solution is precipitated by means of ten times its quantity of ether. The light-yellow precipitate thus obtained is filtered off, washed with ether and dried at a low temperature.

Having now particularly described our invention, what we claim is:

As a new product, the dihydrochlorid of the $3\text{-}3^1\text{-}$diamino$\text{-}4\text{-}4^1\text{-}$dioxyarsenobenzene, being a yellow powder readily soluble in water and methyl-alcohol, almost insoluble in ether and acetone, from the aqueous solution of which is precipitated by means of sodium carbonate, sodium acetate or caustic soda lye, the diaminodioxyarsenobenzene, which re-dissolves in an excess of the caustic soda lye, a difficultly soluble sulfate being precipitated from the aqueous solution of the dihydrochlorid by means of diluted sulfuric acid.

In testimony whereof, we affix our signatures in presence of two witnesses.

PAUL EHRLICH.
ALFRED BERTHEIM.

Witnesses:
   JEAN GRUND,
   CARL GRUND.